US010290420B2

(12) United States Patent
Berg et al.

(10) Patent No.: US 10,290,420 B2
(45) Date of Patent: May 14, 2019

(54) COIL UNIT FOR A TRANSMISSION ARRANGEMENT FOR INDUCTIVE TRANSMISSION OF ENERGY

(71) Applicant: SIEMENS AKTIENGESELLSCHAFT, München (DE)

(72) Inventors: Wilhelm Berg, Nürnberg (DE); Hans Biehringer, Wolframs-Eschenbach (DE); Peter Maisel, Nürnberg (DE); Martin Saliternig, Herzogenaurach (DE)

(73) Assignee: Siemens Aktiengesellschaft, München (DE)

( * ) Notice: Subject to any disclaimer, the term of this patent is extended or adjusted under 35 U.S.C. 154(b) by 154 days.

(21) Appl. No.: 14/969,875

(22) Filed: Dec. 15, 2015

(65) Prior Publication Data

US 2016/0172105 A1    Jun. 16, 2016

(30) Foreign Application Priority Data

Dec. 16, 2014  (DE) .................... 10 2014 226 112
Jan. 20, 2015  (DE) .................... 10 2015 200 847

(51) Int. Cl.
*B60L 11/18* (2006.01)
*H01F 27/02* (2006.01)
(Continued)

(52) U.S. Cl.
CPC ............ *H01F 38/14* (2013.01); *B60L 11/182* (2013.01); *H01F 27/02* (2013.01); *H01F 27/365* (2013.01);
(Continued)

(58) Field of Classification Search
CPC ........ H01F 38/14; H01F 27/02; H01F 27/365; H01F 27/2871; H01F 27/36;
(Continued)

(56) References Cited

U.S. PATENT DOCUMENTS

2001/0045785 A1* 11/2001 Chen ..................... A47J 36/26
                                                                310/104
2011/0084654 A1*  4/2011 Julstrom ................. H02J 7/025
                                                                320/108
(Continued)

FOREIGN PATENT DOCUMENTS

DE    10 2006 025 458 A1    12/2007
DE    10 2012 202 472 A1    8/2013
DE    10 2012 211 151 A1    1/2014

*Primary Examiner* — Drew A Dunn
*Assistant Examiner* — Sailesh Thapa
(74) *Attorney, Agent, or Firm* — Henry M. Feiereisen LLC

(57) ABSTRACT

A coil unit for inductive transmission of energy includes a coil and a flux management unit to manage a magnetic flux during operation of the coil. The flux management unit is arranged behind the at least one coil, when viewed along a coil axis of the coil, and includes at least two flux management sectors and a channel between the flux management sectors. At least partially accommodating the coil and the flux management unit is a housing. A supporting element is arranged between a housing base and a housing lid and configured such that a projection of the supporting element along the coil axis is congruent with or lies within an extent of the flux management unit. A force acting on the housing lid can be diverted via the supporting element past the at least one coil and the at least two flux management sectors to the housing base.

19 Claims, 5 Drawing Sheets

(51) Int. Cl.
*H01F 27/36* (2006.01)
*H01F 38/14* (2006.01)

(52) U.S. Cl.
CPC ........ *Y02T 10/7005* (2013.01); *Y02T 10/7072* (2013.01); *Y02T 90/122* (2013.01); *Y02T 90/14* (2013.01)

(58) Field of Classification Search
CPC ............... B60L 11/182; B60L 11/1829; B60L 11/1833; B60L 11/1846; B60L 2210/30; H02J 7/025; H02J 5/005; H02J 7/0042; H02J 7/0044; H02J 50/10; H02J 17/00
USPC ........................................................ 320/108
See application file for complete search history.

(56) References Cited

U.S. PATENT DOCUMENTS

| | | | | |
|---|---|---|---|---|
| 2014/0292264 | A1* | 10/2014 | Boys | B60L 11/182 320/108 |
| 2015/0102664 | A1* | 4/2015 | Tatsuta | B60L 11/182 307/9.1 |

* cited by examiner

COIL UNIT FOR A TRANSMISSION ARRANGEMENT FOR INDUCTIVE TRANSMISSION OF ENERGY

CROSS-REFERENCES TO RELATED APPLICATIONS

This application claims the priorities of German Patent Applications, Serial No. 10 2014 226 112.0, filed Dec. 16, 2014, and 10 2015 200 847.9, filed Jan. 20, 2015, pursuant to 35 U.S.C. 119(a)-(d), the disclosures of which are incorporated herein by reference in its entirety as if fully set forth herein.

BACKGROUND OF THE INVENTION

The present invention relates to a coil unit for a transmission arrangement for inductive transmission of energy, and to a charging station, an automobile, and a transmission arrangement for inductive transmission of energy.

The following discussion of related art is provided to assist the reader in understanding the advantages of the invention, and is not to be construed as an admission that this related art is prior art to this invention.

Inductive charging systems conventionally use a coil unit. Inductive charging systems or resonant converters are normally based on LC circuits. These resonant circuits are formed by a combination of coils and capacitors. In the case of inductive charging systems for electric or hybrid vehicles, the energy transmission between a base plate and the vehicle takes place via coils that are contained in the device. The coil contained in the base plate usually consists of a ferrite plate in a copper winding.

It would be desirable and advantageous to obviate prior art shortcomings and to provide an improved coil unit for a transmission arrangement for the inductive transmission of energy, which is efficient, compact, stable, and durable while yet being reliable in operation.

SUMMARY OF THE INVENTION

According to one aspect of the present invention, a coil unit for a transmission arrangement for inductive transmission of energy includes at least one coil having an electrical conductor, a flux management unit configured to manage a magnetic flux which occurs during operation of the at least one coil, the flux management unit being arranged in a first plane behind the at least one coil, when viewed along a coil axis of the at least one coil, and including at least two flux management sectors and at least one channel between the at least two flux management sectors, a housing including a housing base and a housing lid configured for attachment to the housing base, the housing at least partially accommodating the at least one coil and the flux management unit, and at least one supporting element arranged between the housing base and the housing lid and configured such that a projection of the at least one supporting element along the coil axis is congruent with or lies within an extent of the flux management unit, the at least one supporting element being arranged such that a force acting on the housing lid is divertible via the at least one supporting element past the at least one coil and the at least two flux management sectors to the housing base.

According to another aspect of the present invention, a charging station for a transmission arrangement for an inductive transmission of energy includes at least one coil unit as set forth above, with the at least one coil of the at least one coil unit being embodied as a stationary primary coil.

According to still another aspect of the present invention, an automobile for a transmission arrangement for an inductive transmission of energy includes at least one coil unit as set forth above, with the at least one coil of the at least one coil unit being embodied as an on-board secondary coil.

According to yet another aspect of the present invention, a transmission arrangement for an inductive transmission of energy includes at least one charging station as set forth above, and at least one automobile as set forth above.

The electrical conductor of the at least one coil may be realized in the form of strands or wires, for example. The electrical conductor may include subconductors arranged in parallel, for example. Depending on specifications, the electrical conductor may be so disposed as to form an essentially round or square coil, for example.

The flux management unit can have a base area which is at least as large as the base area of the coil. When the coil unit is used as a primary coil of the charging station or as a secondary coil of the automobile, the flux management unit is situated below or above the associated coil. The flux management unit has at least two flux management sectors, which, advantageously, are approximately identical in size and divide the base area of the flux management unit into parts of approximately identical size. The flux management unit has a channel between two adjacent flux management sectors, with the channel running continuously through the flux management unit along the coil axis.

Advantageously, there may be at least three or four flux management sectors, each of which can have the base area of a corresponding circular sector when a base area of the flux management unit is circular. When there are four flux management sectors and a square base area of the flux management unit, the flux management sectors advantageously have each the base area of a square. Thus, the coil unit normally has channels which extend radially outward from its center. It is basically also possible to provide more flux management sectors than channels, such that a channel is arranged between certain adjacent flux management sectors while the remaining adjacent flux management sectors essentially abut each other.

Provision is also made for at least one supporting element between the housing base and the housing lid, wherein the supporting element is arranged such that a projection of the respective supporting element along the coil axis is congruent with the extent or base area of the flux management unit or lies within the extent or base area of the flux management unit. Moreover, the supporting element is embodied such that a force acting on the housing lid can be diverted by means of the supporting element past the at least one coil and the at least two flux management sectors to the housing base.

When the coil unit is used as a primary coil of the charging station, the force acting on the housing lid may occur as a result of a vehicle driving over the coil unit, for example. In this case, the vehicle tire exerts pressure on the coil unit with a certain proportion of the vehicle weight. When the coil unit is used as a secondary coil of the automobile, the force acting on the housing lid may occur as a result of the automobile resting on the ground, e.g. on a curbstone, at the charging station or the like. It is also conceivable for the force on the housing lid to be exerted by a large foreign body which is located between the ground and the motor vehicle.

In particular, the stability and therefore the general suitability of the coil unit is improved by virtue of the housing and the at least one supporting element, such that damage to the coil unit cannot be caused as a result of vehicles driving over it directly with their tires. Specifically, this is achieved by virtue of the supporting element diverting the impacting force past the coil and the flux management sectors to the housing base. This ensures that the more sensitive parts of the coil unit, in particular the coil and the flux management sectors, are particularly well-protected. This is also achieved by virtue of the impacting force being transmitted not only via the edges of the housing, but also within the flux management unit to the housing base.

Any permanent deformation of the housing lid is thereby avoided. This is advantageous since a sufficiently deformed housing lid could press upon and subsequently damage the coil and/or the flux management sectors.

The coil unit is of comparatively simple structure. The housing and the at least one supporting element allow the use of comparatively thin and/or lightweight elements for the housing lid and the supporting element. It is thus possible to eliminate the need for additional and in particular thicker protective plates.

Aluminum or aluminum alloys may be used for the housing base and ferrite materials for the flux management sectors, for example. A suitably robust synthetic material, fiberglass and/or carbon fiber material or mixtures thereof, for example, may be used for the supporting element.

The coil unit or the transmission arrangement can be configured for inductive transmission of energy in the range of several kilowatts.

The automobile may be embodied as an electric vehicle or a hybrid vehicle, for example, wherein the vehicle may be a passenger car, a bus, or a truck, for example. The on-board secondary coil can, advantageously, be connected to a power electronics system which includes a rectifier, an indirect capacitor, and an inverse rectifier, for example. The power electronics system can, advantageously, be connected at the rectifier to an energy store such as an accumulator or ultracapacitor, for example, and at the inverse rectifier to at least one electric motor such as a synchronous motor or an asynchronous motor, for example, for driving the automobile. In this case, the power electronics system is advantageously configured for energy recovery during a braking process of the automobile, in particular for four-quadrant operation. For example, the power electronics system and the electric motor are configured for a continuous power of tens of kilowatts.

According to another advantageous feature of the present invention, the flux management unit can have a continuous central opening along the coil axis, with at least one supporting element including a supporting cylinder having at least one section arranged in the central opening. The supporting cylinder may be hollow, for example, in order to save material and weight while at the same time increasing the maximum load and/or flexural rigidity of the supporting cylinder. As a result of the arrangement of the supporting cylinder in the continuous opening in the center of the flux management unit, permanent deformation of the housing lid is prevented in a particularly effective manner, since forces acting on the housing lid are often absorbed from the housing lid immediately in the vicinity of the point of exposure by the supporting cylinder and diverted to the housing base. The supporting cylinder therefore increases mechanical stability of the coil unit.

According to another advantageous feature of the present invention, the at least one supporting element can include a supporting cuboid having at least one section arranged in the at least one channel. As described above, the coil unit normally has channels which extend radially outwards from the center. The arrangement of a supporting cuboid in a channel assists the diversion to the housing base of a force which acts on the housing lid, with the force being routed past the coil and the flux management sectors. The supporting cuboid therefore increases mechanical stability of the coil unit.

According to another advantageous feature of the present invention, the at least one supporting element can include a supporting plate arranged between the housing base and the flux management unit. The supporting plate serves to divert a force which acts on the housing lid to the housing base and therefore increases the mechanical stability of the coil unit. The supporting plate may be made of a synthetic material, for example.

According to another advantageous feature of the present invention, the supporting plate and at least one supporting cuboid and/or the supporting cylinder can be formed in one piece to realize a unitary structure. The unitary structure of the supporting plate and the at least one supporting cuboid and/or the supporting cylinder provides a further advantage in addition to the increased stability and improved diversion to the base plate of a force acting on the housing lid, since particularly reliable positioning of the flux management sectors is ensured at the same time. Advantageously, the supporting plate, the at least one supporting cuboid, and the supporting cylinder are embodied as a unitary structure, although provision may also be made to form only the supporting plate and the at least one supporting cuboid in one piece, or only the supporting plate and the supporting cylinder in one piece.

According to another advantageous feature of the present invention, the at least one supporting element can include at least one supporting cover configured to at least partially accommodate, in particular in combination with the housing base or the supporting plate, at least one of the at least two flux management sectors. The supporting cover therefore ensures in a particularly effective manner that a force which acts on the housing lid and subsequently on the respective supporting cover is transferred past the respective flux management sector. To this end, the supporting cover can completely or partially house one or more of the respective flux management sectors, in particular in conjunction with the housing base or optionally the supporting plate. In addition to diverting the force, the supporting cover also provides an effective protection for the flux management sector, e.g. against dirt or moisture.

According to another advantageous feature of the present invention, the coil can include at least two turns arranged in a second plane in parallel relationship to the first plane, wherein a wound supporting cuboid having at least one section that can be arranged between the two turns and between the at least one supporting cover and the housing lid, with the supporting cuboid, when viewed along the coil axis, having a thickness which is greater than a thickness of each of the two turns. As a result, the coil is essentially flat. In particular, the turns of the coil are therefore arranged in the form of a spiral from the inside to the outside of the coil. A wound supporting cuboid is at least sectionally arranged between two adjacent turns in this case, and therefore runs from the inside to the outside of the coil, particularly in the case of spiral coils.

The wound supporting cuboid also increases mechanical stability of the coil unit, specifically by absorbing and diverting from the housing lid, over a particularly large surface, forces which act on the housing lid. For this purpose, the wound supporting cuboid is arranged between the housing lid and the supporting cover and, viewed along the coil axis, is thicker than the respective turn. In this way, forces absorbed by the wound supporting cuboid can be diverted past the coil and the flux management sector to the housing base. As a result of the large-surface absorption, onward transfer and distribution of the acting forces, pressure peaks are avoided, such that a particularly stable coil unit can be realized.

According to another advantageous feature of the present invention, the at least one supporting element can be configured at least partially in one piece with the housing base or the housing lid. The supporting element or the previously described component parts of the supporting element, e.g. the supporting cylinder, the supporting cuboid, the supporting plate, the supporting cover and/or the wound supporting cuboid, may be formed wholly or partially in one piece with the housing base and/or the housing lid. The stability of the coil unit is further increased thereby, while at the same time ensuring good positioning of the coil or the flux management sector, for example.

According to another advantageous feature of the present invention, the electrical conductor can have at least one section arranged in the at least one channel from an inside of the at least one coil to an outside of the at least one coil. The return of the electrical conductor via the at least one channel allows a compact structure of the coil unit, since this return saves structural space in comparison with conventional constructions. By virtue of the comparatively modest demands in terms of structural space, the coil unit according to the invention has increased general suitability.

According to another advantageous feature of the present invention, at least one positioning coil can be provided having at least one section arranged in the at least one channel. The flux management unit can include three or four flux management sectors and two or three or four channels between the at least two flux management sectors. The at least one positioning coil can be used to localize or position the secondary coil relative to the primary coil of the proposed transmission arrangement. Two, three or four channels are preferably provided for this purpose, with the channels advantageously being offset relative to each other by 180°, 120° or 90°, with a positioning coil being arranged, at least in part, in each of these channels. This allows sufficiently accurate localization or positioning and therefore ultimately increases efficiency of the inductive energy transmission.

The proposed arrangement of the respective positioning coil at least sectionally in the respective channel allows a compact structure of the proposed coil unit, since structural space can be saved in this way. It is thereby possible to avoid an increase in housing size or an additional housing for the respective positioning coil, and any reduction in structural space which often occurs as a consequence.

The positioning coil can also be reliably protected against damage, e.g. caused, when driving over the coil unit or similar cause. Advantageously, a supporting cuboid can be placed in the channel, with the supporting cuboid advantageously being sized to have sufficient hollow space to accommodate the positioning coil. This ensures that encountered forces can be transmitted via the supporting cuboid past the positioning coil to the housing base.

The coil unit with at least one such positioning coil can be configured as an on-board secondary coil in an automobile. In principle, the coil unit with at least one such positioning coil can however also be configured as a stationary primary coil for use in a charging station.

Overall, the general suitability of the coil unit is therefore increased as a result of the proposed arrangement of the positioning coil.

According to another advantageous feature of the present invention, at least one protective screen can be provided to at least partially surround the at least one positioning coil at least within the flux management unit. The protective screen protects the positioning coil against interference from the magnetic field of the coil which is provided for the inductive transmission of energy. As a result, the localization or positioning of the secondary coil relative to the primary coil becomes more reliable.

According to another advantageous feature of the present invention, the at least one protective screen can surround the at least one positioning coil in a form of a U defining a gap which is oriented toward the at least one coil, when viewed in a cross-section through the channel. The protective screen ensures sufficient accuracy in respect of the localization and positioning of the secondary coil relative to the primary coil, and ensures adequate protection of the positioning coil against interference from the magnetic field of the coil which is provided for the inductive transmission of energy. In this case, the protection is achieved in particular by virtue of the protective screen which, viewed in a cross-section through the channel, substantially surrounds the positioning coil along its whole circumference. The sufficient accuracy in respect of the localization and positioning is ensured in particular by virtue of the protective screen, in the same cross-section, having a gap which is oriented toward the at least one coil and therefore toward any other coil of the transmission arrangement.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
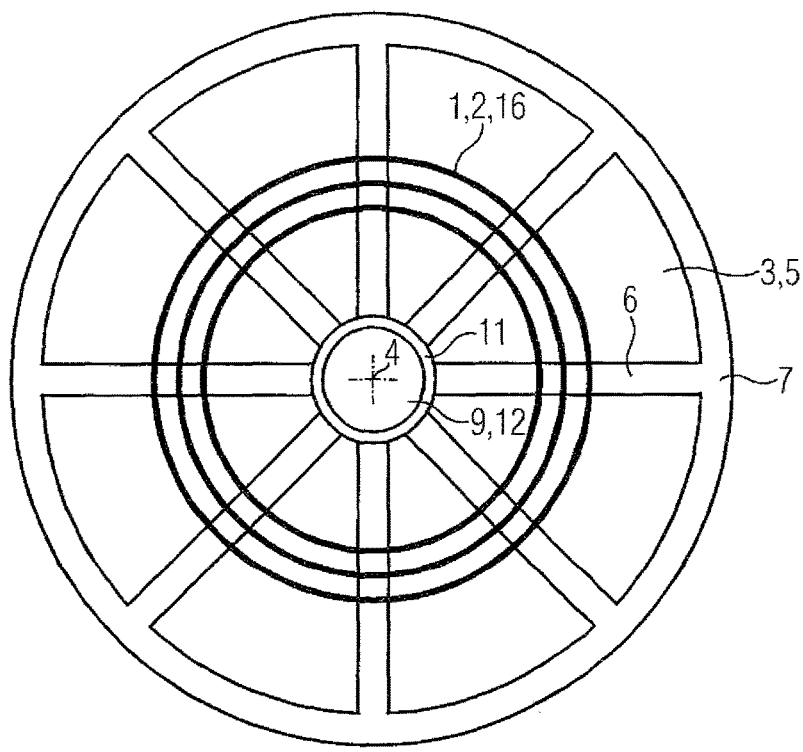
FIG. 1 shows a schematic plan view of a first embodiment of a coil unit according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic plan view of a first embodiment of a coil unit according to the present invention along a coil axis 4. The coil unit includes a coil 1 with an electrical conductor 2. The coil 1 has a plurality of turns 16, only a few of which are indicated in FIG. 1 for greater clarity.

The coil unit also has a flux management unit 3 for managing a magnetic flux which occurs during operation of the coil 1, wherein the flux management unit 3, when viewed along the coil axis 4, is arranged in a first plane behind the coil 1. In this embodiment, the flux management unit 3 has eight flux management sectors 5 and eight channels 6 between two adjacent flux management sectors 5. The coil 1 and the flux management unit 3 are accommodated in a housing having a housing base 7 illustrated in FIG. 1.

The coil unit further includes a supporting element 9 in the form of a supporting cylinder 12. The flux management unit 3 has hereby a continuous opening 11 in its center along the coil axis 4, wherein at least a section of the supporting cylinder 12 is arranged in the opening 11. As a result, the projection of the supporting cylinder 12 along the coil axis 4 is within the flux management unit 3. The supporting element 9 in the form of the supporting cylinder 12 is arranged such that a force 10 acting on a housing lid 8, shown in FIG. 2, can be diverted by means of the supporting element 9 past the coil 1 and the flux management sectors 5 to the housing base 7.

Figure 2:
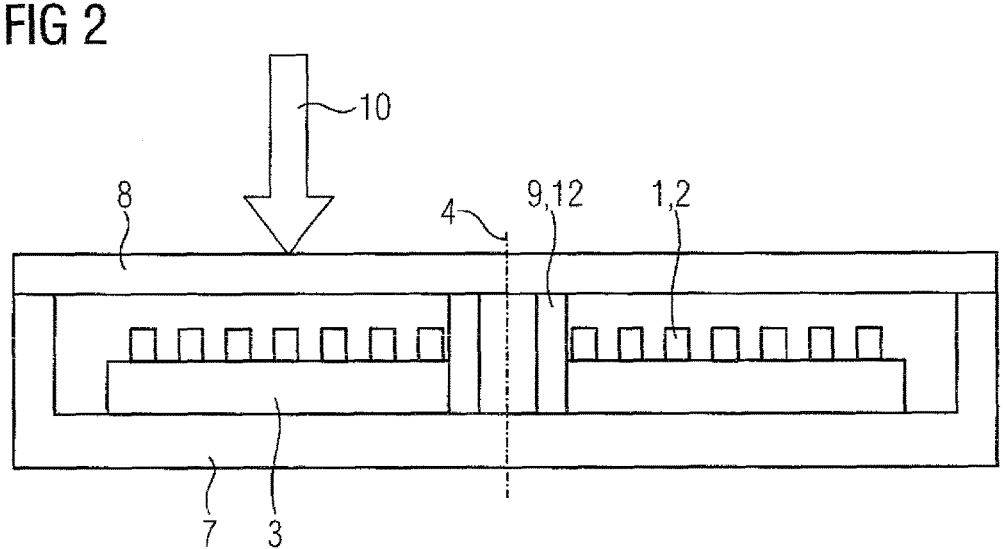
FIG. 2 shows a schematic cross section of the coil unit of FIG. 1.

FIG. 2 shows a schematic illustration of the first embodiment in a cross-section along the coil axis 4, with two of the flux management sectors 5 shown in the sectional view. Parts corresponding with those in FIG. 1 are denoted by identical reference numerals and not explained again.

The housing comprised of the housing base 7 and the housing lid 8, accommodates the coil 1 and the flux management unit 3. when a force 10 acts on the housing lid 8, the force 10 is diverted via the supporting cylinder 12 past the coil 1 and the flux management unit 3 to the housing base 7.

Figure 3:
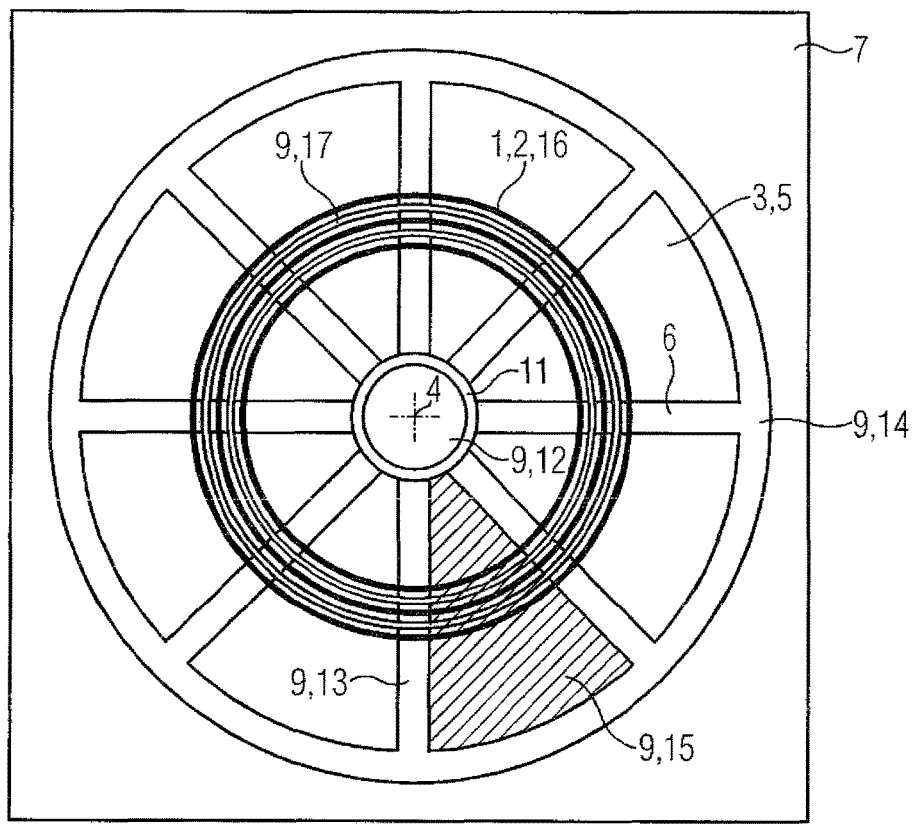
FIG. 3 shows a schematic plan view of a second embodiment of a coil unit according to the present invention.

FIG. 3 shows a schematic illustration of a second embodiment of the coil unit by way of a plan view along the coil axis 4. Parts corresponding with those in FIG. 1 are denoted by identical reference numerals and not explained again. The description below will center on the differences between the embodiments. In this embodiment, provision is made for a supporting plate 14 between the housing base 7 and the flux management unit 3. A supporting cuboid 13, which is part of the supporting element 9, is also arranged in each of the channels 6. Furthermore, a wound supporting cuboid 17 is arranged between two adjacent turns 16. The supporting element 9 further has a supporting cover 15, which is only indicated for one of the flux management sectors 5. The supporting cover 15 at least partially houses one of the flux management sectors 5. The wound supporting cuboid 17 is arranged between the supporting cover 15 and the housing lid 8 and has a thickness 18 which, when viewed along the coil axis 4, is greater than a thickness 19 of the turn 16, as illustrated in FIG. 4.

Figure 4:
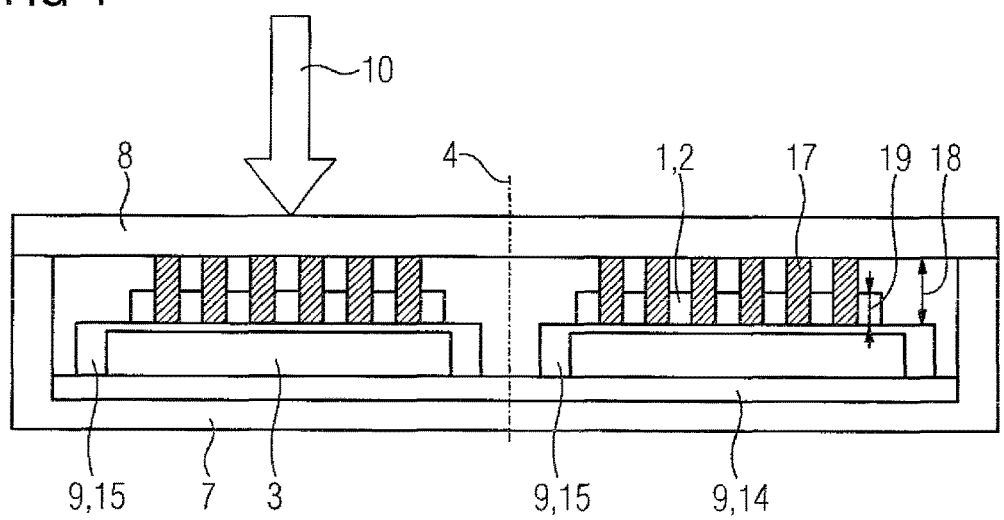
FIG. 4 shows a schematic cross section of the coil unit of FIG. 3.

FIG. 4 shows a schematic illustration of the second embodiment in a cross-section along the coil axis 4, two of the flux management sectors 5 shown in the sectional view. FIG. 4 shows the supporting cover 15 and the wound supporting cuboid 17. The thickness 18 of the wound supporting cuboid 17 is greater than the thickness 19 of the turn 16. The supporting plate 14 is also illustrated.

Figure 5:
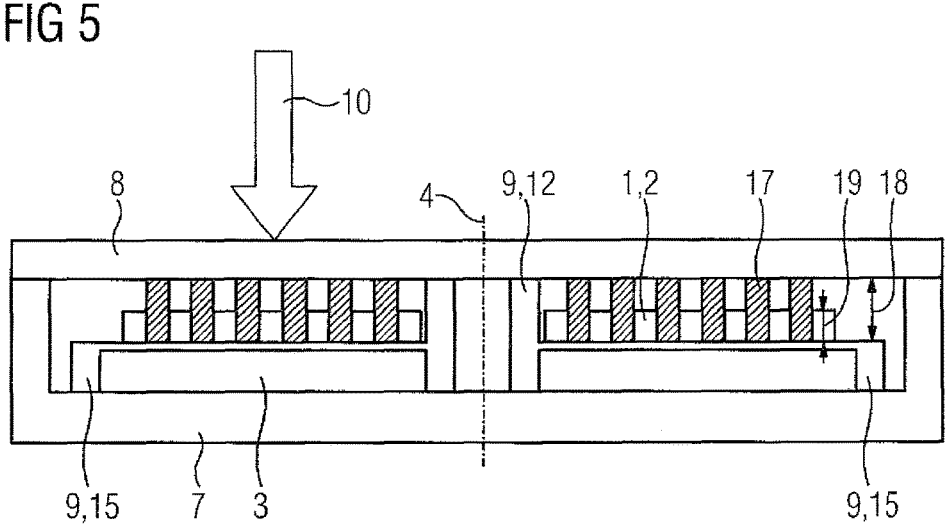
FIG. 5 shows a schematic plan view of a third embodiment of a coil unit according to the present invention.

FIG. 5 shows a schematic illustration of a third embodiment of the coil unit in a cross-section along the coil axis 4, two of the flux management sectors 5 shown in the sectional view. Unlike the second embodiment, provision is made here for a supporting cylinder 12, which is formed in one piece as a unitary structure with the supporting cover 15. The coil unit of FIG. 5 has no supporting plate 14, though this should be considered optional.

Figure 6:
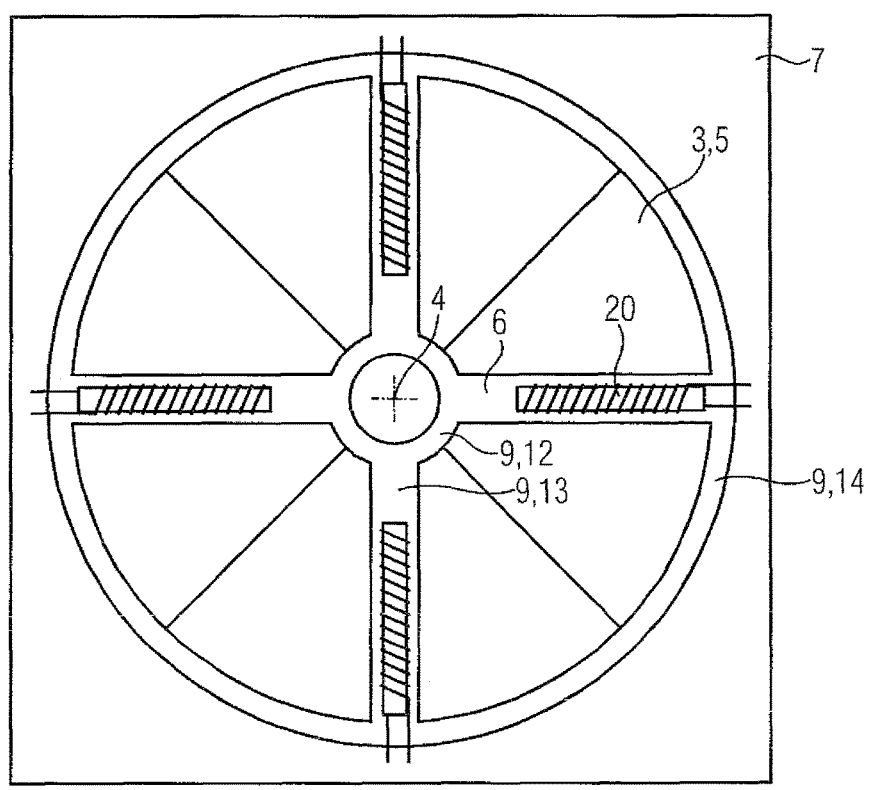
FIG. 6 shows a schematic cross section of a fourth embodiment of a coil unit according to the present invention.

FIG. 6 shows a schematic illustration of a fourth embodiment of the coil unit, showing a plan view along a coil axis 4. Given the similarities to the coil unit of FIGS. 3 and 4, the description below will center on the differences between the embodiments. The coil unit of FIG. 6 has also a coil 1 and optionally a wound supporting cuboid 17 as described above in connection with the coil units of FIGS. 1-5. However, for greater clarity, the coil 1 and the wound supporting cuboid 17 are not illustrated in FIG. 6. Unlike the coil units of FIGS. 3 and 4, four positioning coils 20 are provided in the coil unit of FIG. 6, one of the positioning coils 20 being arranged in each of the channels 6.

Figure 7:
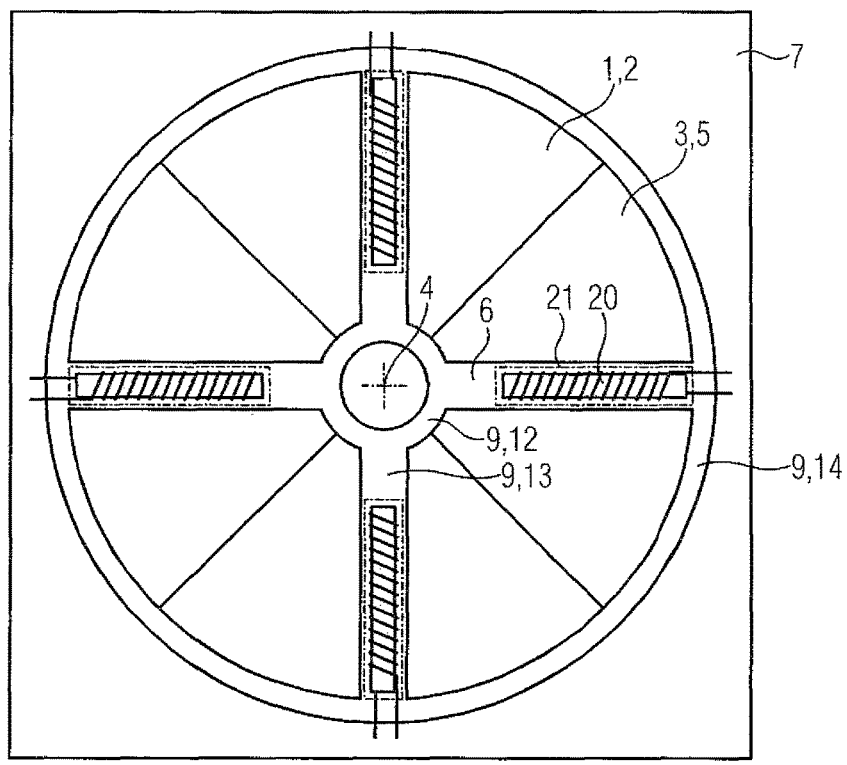
FIG. 7 shows a schematic plan view of a fifth embodiment of a coil unit according to the present invention.

FIG. 7 shows a schematic illustration of a fifth embodiment of the coil unit, showing a plan view along a coil axis 4. Given the similarities to the coil unit of FIG. 6, the description below will center on the differences between the embodiments. The positioning coil 20 is partially surrounded by a protective screen 21. The protective screen 21 surrounds the positioning coil 20 in a form of a U having a gap, the gap of the U being oriented toward the coil 1.

The supporting plate 14 and a supporting cover 15 are also provided, though the supporting cover 15 is not illustrated in FIG. 7.

Figure 8:
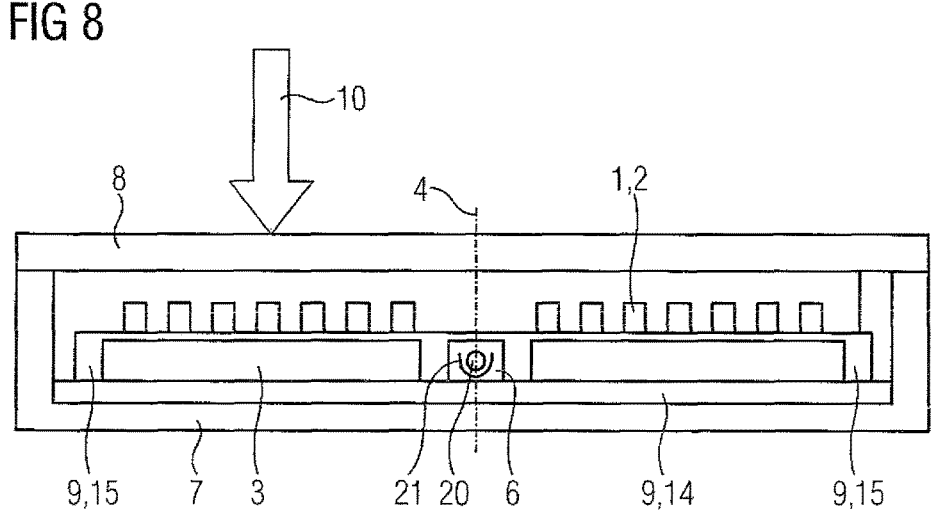
FIG. 8 shows a schematic cross section of the coil unit of FIG. 7.

FIG. 8 shows a schematic illustration of the fifth embodiment, showing a cross-section through one of the channels 6. FIG. 8 illustrates the supporting cover 15 and the sectioned channel 6, in which, for example, a supporting cylinder 12 can be accommodated. The coil 1 with its electrical conductor 2 is indicated here, and the coil unit may optionally include a wound supporting cuboid, although such a wound supporting cuboid is not illustrated.

Figure 9:
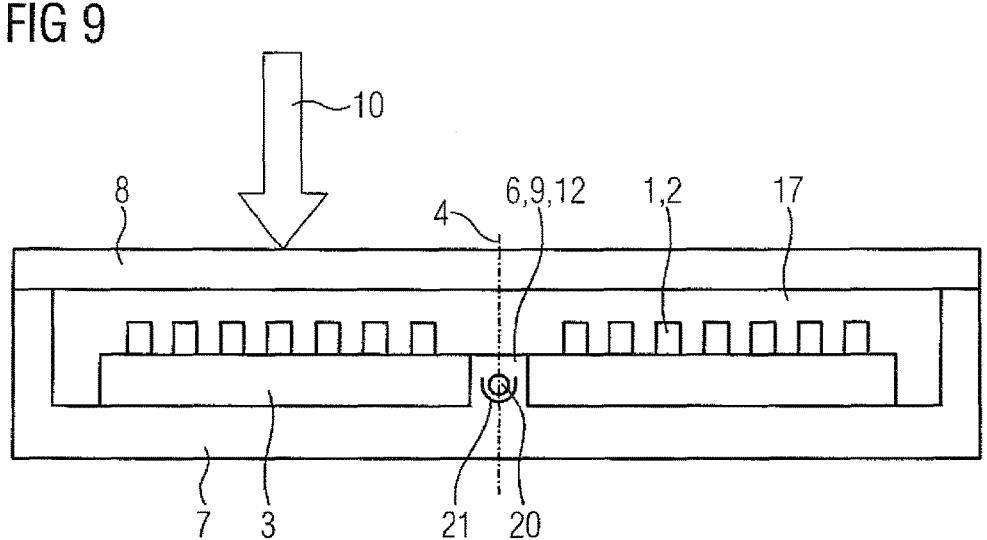
FIG. 9 shows a schematic plan view of a sixth embodiment of a coil unit according to the present invention.

FIG. 9 shows a schematic illustration of a sixth embodiment of the coil unit, showing a cross-section through one of the channels 6. Given the similarities to the coil unit of FIG. 8, the description below will center on the differences between the embodiments. Unlike the coil unit of FIG. 8, no separate supporting plate 14 is provided in the coil unit of FIG. 9, but the housing base 7 projects into the channel 6 and at the same time forms the supporting cuboid 12. The coil 1 with its electrical conductor 2 is indicated here, and the coil unit may optionally include a wound supporting cuboid, although such a wound supporting cuboid is not illustrated.

Figure 10:
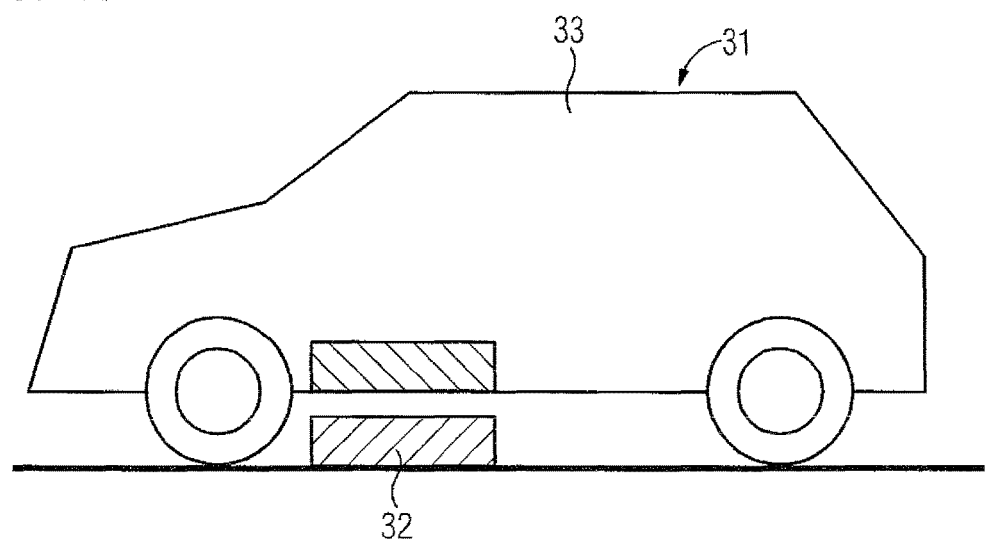
FIG. 10 shows a schematic illustration of a transmission arrangement, having incorporated therein the subject matter of the present invention.

FIG. 10 shows a schematic illustration of an embodiment of a transmission arrangement 31 for the inductive transmission of energy, including a charging station 32 and an automobile 33.

The flux management units 3 and the supporting elements 9, 12, 15 have inner and outer concave and convex circular surfaces. The management units 3 and the supporting elements 9,12,15 are arranged relative to each other so that either the outer convex circular surface of the supporting element is in direct contact with the inner concave circular surface of the flux management unit, or the inner concave circular surface of the supporting element is in direct contact with the outer convex circular surface of the flux management unit, or both the outer convex circular surface and the inner concave circular surface of the supporting element are in direct contact with the inner concave circular surface and the outer convex surface of the flux management unit correspondingly over a whole circumference.

In summary, the invention relates to a coil unit for a transmission arrangement for inductive transmission of energy, in particular between a charging station with a stationary primary coil and an automobile with an on-board secondary coil, with the coil unit including at least one coil with an electrical conductor and a flux management unit for managing a magnetic flux that occurs during the operation of the at least one coil. The flux management unit, viewed along a coil axis of the at least one coil, is arranged in a first plane behind the coil, wherein the flux management unit has at least two flux management sectors and at least one channel between two adjacent flux management sectors. The invention further relates to such a charging station, such an automobile and such a transmission arrangement. In order to increase the general suitability of a coil unit for a transmission arrangement for inductive transmission of energy, a housing which has a housing base and a housing lid is proposed, wherein the housing at least partially houses the at least one coil and the flux management unit. provision is made for at least one supporting element which is arranged between the housing base and the housing lid, wherein a projection of the at least one supporting element along the coil axis is congruent with or lies within the extent of the flux management unit. The supporting element is embodied such that a force acting on the housing lid can be diverted by means of the respective supporting element past the at least one coil and the at least two flux management sectors to the housing base.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A coil unit for a transmission arrangement for inductive transmission of energy, comprising:
   at least one coil having an electrical conductor;
   a flux management unit configured to manage a magnetic flux which occurs during operation of the at least one coil, said flux management unit being arranged in a first plane behind the at least one coil, when viewed along a coil axis of the at least one coil, and including at least two flux management sectors and at least one channel between the at least two flux management sectors;
   a housing including a housing base and a housing lid configured for attachment to the housing base, said housing at least partially accommodating the at least one coil and the flux management unit; and
   at least one supporting element arranged between the housing base and the housing lid and configured such that a projection of the at least one supporting element along the coil axis is congruent with or lies within an extent of the flux management unit, said at least one supporting element being arranged such that a force acting on the housing lid is divertible via the at least one supporting element past the at least one coil and the at least two flux management sectors to the housing base,
   wherein the flux management unit has an inner opening with an inner concave circular surface and an outer periphery with an outer convex circular surface, said supporting element has an inner concave circular surface and an outer convex circular surface, and said supporting element is arranged relative to said flux management unit so that either said outer convex circular surface of the supporting element is in direct contact with said inner concave circular surface of said flux management unit, or said inner concave circular surface of said supporting element is in direct contact with said outer convex circular surface of said flux management unit, or both said outer convex circular surface and said inner concave circular surface of said supporting element are in direct contact with said inner concave circular surface and said outer convex surface of said flux management unit correspondingly over a whole circumference.

2. The coil unit of claim 1 for inductive transmission of energy between a charging station having the coil as a stationary primary coil and an automobile having another said coil as an on-board secondary coil.

3. The coil unit of claim 1, wherein the flux management unit has a continuous central opening along the coil axis, said at least one supporting element including a supporting cylinder having at least one section arranged in the central opening.

4. The coil unit of claim 1, wherein the at least one supporting element includes a supporting cuboid having at least one section arranged in the at least one channel.

5. The coil unit of claim 1, wherein the at least one supporting element includes a supporting plate arranged between the housing base and the flux management unit.

6. The coil unit of claim 1, wherein the at least one supporting element includes at least one supporting cuboid and a supporting plate formed in one piece with the supporting cuboid to realize a unitary structure.

7. The coil unit of claim 3, wherein the at least one supporting element includes at least one supporting cuboid and a supporting plate, at least one of the supporting cuboid and the supporting plate being formed in one piece with the supporting cylinder to realize a unitary structure.

8. The coil unit of claim 1, wherein the at least one supporting element includes at least one supporting cover configured to at least partially accommodate at least one of the at least two flux management sectors.

9. The coil unit of claim 5, wherein the at least one supporting element includes at least one supporting cover configured to at least partially accommodate jointly with the housing base or the supporting plate at least one of the at least two flux management sectors.

10. The coil unit of claim 8, wherein the coil includes at least two turns arranged in a second plane in parallel relationship to the first plane, and further comprising a wound supporting cuboid having at least one section arranged between the two turns and between the at least one supporting cover and the housing lid, said supporting cuboid, when viewed along the coil axis, having a thickness which is greater than a thickness of each of the two turns.

11. The coil unit of claim 1, wherein the at least one supporting element is configured at least partially in one piece with at least one of the housing base and the housing lid.

12. The coil unit of claim 1, wherein the electrical conductor has at least one section arranged in the at least one channel that is arranged between the at least two flux management sectors and extends from an inside of the at least one coil to an outside of the at least one coil.

13. The coil unit of claim 1, further comprising at least one positioning coil having at least one section arranged in the at least one channel.

14. The coil unit of claim 1, wherein the flux management unit includes three or four flux management sectors and two or three or four channels between the at least two flux management sectors.

15. The coil unit as claimed in claim 14, further comprising at least one protective screen configured to at least partially surround the at least one positioning coil at least within the flux management unit.

16. The coil unit as claimed in claim 15, wherein the at least one protective screen surrounds the at least one positioning coil in a form of a U defining a gap which is oriented toward the at least one coil, when viewed in a cross-section through the channel.

17. A charging station for a transmission arrangement for inductive transmission of energy, comprising at least one coil unit including a at least one coil having an electrical conductor, a flux management unit configured to manage a magnetic flux which occurs during operation of the at least one coil, said flux management unit being arranged in a first plane behind the at least one coil, when viewed along a coil axis of the at least one coil, and including at least two flux management sectors and at least one channel between the at least two flux management sectors, a housing including a housing base and a housing lid configured for attachment to the housing base, said housing at least partially accommodating the at least one coil and the flux management unit, and at least one supporting element arranged between the housing base and the housing lid and configured such that a projection of the at least one supporting element along the coil axis is congruent with or lies within an extent of the flux management unit, said at least one supporting element being arranged such that a force acting on the housing lid is divertible via the at least one supporting element past the at least one coil and the at least two flux management sectors to the housing base, said at least one coil of the at least one coil unit being embodied as a stationary primary coil, wherein the flux management unit has an inner opening with an inner concave circular surface and an outer periphery with an outer convex circular surface, said supporting element has an inner concave circular surface and an outer convex circular surface, and said supporting element is arranged relative to said flux management unit so that either said outer convex circular surface of the supporting element is in direct contact with said inner concave circular surface of said flux management unit, or said inner concave circular surface of said supporting element is in direct contact with said outer convex circular surface of said flux management unit, or both said outer convex circular surface and said inner concave circular surface of said supporting element are in direct contact with said inner concave circular surface and said outer convex surface of said flux management unit correspondingly over a whole circumference.

18. An automobile for a transmission arrangement for inductive transmission of energy, comprising at least one coil unit including a at least one coil having an electrical conductor, a flux management unit configured to manage a magnetic flux which occurs during operation of the at least one coil, said flux management unit being arranged in a first plane behind the at least one coil, when viewed along a coil axis of the at least one coil, and including at least two flux management sectors and at least one channel between the at least two flux management sectors, a housing including a housing base and a housing lid configured for attachment to the housing base, said housing at least partially accommodating the at least one coil and the flux management unit, and at least one supporting element arranged between the housing base and the housing lid and configured such that a projection of the at least one supporting element along the coil axis is congruent with or lies within an extent of the flux management unit, said at least one supporting element being arranged such that a force acting on the housing lid is divertible via the at least one supporting element past the at least one coil and the at least two flux management sectors to the housing base, said at least one coil of the at least one coil unit being embodied as an on-board secondary coil, wherein the flux management unit has an inner opening with an inner concave circular surface and an outer periphery with an outer convex circular surface, said supporting element has an inner concave circular surface and an outer convex circular surface, and said supporting element is arranged relative to said flux management unit so that either said outer convex circular surface of the supporting element is in direct contact with said inner concave circular surface of said flux management unit, or said inner concave circular surface of said supporting element is in direct contact with said outer convex circular surface of said flux management unit, or both said outer convex circular surface and said inner concave circular surface of said supporting element are in direct contact with said inner concave circular surface and said outer convex surface of said flux management unit correspondingly over a whole circumference.

19. A transmission arrangement for inductive transmission of energy, comprising:
at least one charging station comprising at least one coil unit including a at least one coil having an electrical conductor, a flux management unit configured to manage a magnetic flux which occurs during operation of the at least one coil, said flux management unit being arranged in a first plane behind the at least one coil, when viewed along a coil axis of the at least one coil, and including at least two flux management sectors and at least one channel between the at least two flux management sectors, a housing including a housing base and a housing lid configured for attachment to the housing base, said housing at least partially accommodating the at least one coil and the flux management unit, and at least one supporting element arranged between the housing base and the housing lid and configured such that a projection of the at least one supporting element along the coil axis is congruent with or lies within an extent of the flux management unit, said at least one supporting element being arranged such that a force acting on the housing lid is divertible via the at least one supporting element past the at least one coil and the at least two flux management sectors to the housing base, said at least one coil of the at least one coil unit being embodied as a stationary primary coil, wherein the flux management unit has an inner opening with an inner concave circular surface and an outer periphery with an outer convex circular surface, said supporting element has an inner concave circular surface and an outer convex circular surface, and said supporting element is arranged relative to said flux management unit so that either said outer convex circular surface of the supporting element is in direct contact with said inner concave circular surface of said flux management unit, or said inner concave circular surface of said supporting element is in direct contact with said outer convex circular surface of said flux management unit, or both said outer convex circular surface and said inner concave circular surface of said supporting element are in direct contact with said inner concave circular surface and said outer convex surface of said flux management unit correspondingly over a whole circumference; and at least one automobile as set forth in claim 18.

* * * * *